United States Patent [19]
Ohtaki

[11] Patent Number: 6,032,206
[45] Date of Patent: Feb. 29, 2000

[54] METHOD OF REDUCING ACCESS WHEN PASSING DATA FROM EXTERNAL MEMORY THROUGH BUFFER TO DATA PROCESSOR BY ALLOCATING BUFFER PORTION FOR RECEIVING EXTERNAL MEMORY'S IDENTIFICATION DATA

[75] Inventor: Toshiyuki Ohtaki, Yamagata, Japan

[73] Assignee: Samsung Electronics Co., Ltd, Rep. of Korea

[21] Appl. No.: 08/998,083

[22] Filed: Dec. 24, 1997

[30] Foreign Application Priority Data

Dec. 26, 1996 [JP] Japan .................................. 8-348571

[51] Int. Cl.[7] ............................. G06F 13/14; G06F 13/12
[52] U.S. Cl. ............................ 710/53; 710/129; 711/163; 711/165
[58] Field of Search ................................. 710/1, 52, 53, 710/129; 711/163, 165

[56] References Cited

U.S. PATENT DOCUMENTS

| | | | |
|---|---|---|---|
| 4,937,779 | 6/1990 | Ina ........................................... | 364/900 |
| 5,418,923 | 5/1995 | Mihara et al. ........................... | 395/425 |
| 5,602,781 | 2/1997 | Isobe .................................... | 365/189.05 |
| 5,625,840 | 4/1997 | Numata et al. ......................... | 395/825 |
| 5,737,550 | 4/1998 | Song ....................................... | 395/310 |
| 5,832,308 | 11/1998 | Nakamura et al. ...................... | 395/873 |
| 5,842,210 | 11/1998 | Chen et al. .............................. | 707/10 |

*Primary Examiner*—Thomas C. Lee
*Assistant Examiner*—Rehana Perveen
*Attorney, Agent, or Firm*—Dilworth & Barrese

[57] ABSTRACT

A method for passing data of an external memory device through a buffer to a data processor is provided. The method divides the storage region of the buffer into two subregions, and passes a first data set read from the external memory device through one of the two subregions to the data processor in response to a first instruction of the data processor. When a second data set required by said data processor is the same as the first data set, the data stored in the one subregion is passed directly to the data processor instead of retrieving the same from the external memory device. When the second data is different from the first data, it is read from the external memory device and passed through the other allocated subregion to the data processor.

9 Claims, 3 Drawing Sheets

| DATA FLOW STEP No. | REQUESTED DATA | BLOCK STATE WHEN REQUESTING DATA | | DATA SOUGHT | No. OF DATA SEEKING | BLOCK STATE AFTER DATA REQUEST | |
|---|---|---|---|---|---|---|---|
| | | Bva | Bvb | | | Bva | Bvb |
| 1 | Dsa | — | — | Dsa | 1 | Dsa | — |
| 2 | $F_1$ | Dsa | — | $F_1$ | 1 | Dsa | $F_1$ |
| 3 | Dsa, $F_2$ | Dsa | $F_1$ | $F_2$ | 1 | Dsa | $F_2$ |
| 4 | Dsa, $F_3$ | Dsa | $F_2$ | $F_3$ | 1 | Dsa | $F_3$ |
| 5 | Dsb | Dsa | $F_3$ | Dsb | 1 | Dsb | $F_3$ |
| 6 | Dsc | Dsb | $F_3$ | Dsc | 1 | Dsb | Dsc |
| 7 | $F_4$ | Dsb | Dsc | $F_4$ | 1 | $F_4$ | Dsc |
| 8 | Dsc, $F_5$ | $F_4$ | Dsc | $F_5$ | 1 | $F_5$ | Dsc |
| 9 | Dsd | $F_5$ | Dsc | Dsd | 1 | $F_5$ | Dsd |
| 10 | $F_6$ | $F_5$ | Dsd | $F_6$ | 1 | $F_6$ | Dsd |

FIG. 2

METHOD OF REDUCING ACCESS WHEN PASSING DATA FROM EXTERNAL MEMORY THROUGH BUFFER TO DATA PROCESSOR BY ALLOCATING BUFFER PORTION FOR RECEIVING EXTERNAL MEMORY'S IDENTIFICATION DATA

BACKGROUND OF THE INVENTION

1. Field of the Invention

The present invention relates to data transmission, and more particularly, it relates to a method for passing data from an external memory device through a buffer to a data processor.

2. Description of the Related Art

When a data processor retrieves specific data from an external memory device such as an optical disk drive, the specific data is passed from the optical disk through a buffer to the data processor. In this case, the buffer that is x bytes in size usually holds the last x bytes of data that moved between the external memory device and the data processor. Hence, whenever the data processor retrieves new data from the external memory device, the new data replaces the old data stored in the buffer during the previous data retrieval.

Meanwhile, the data structure of an external memory such as a magnetic optical disk includes disk data for identification, directory data and file data. Referring to FIG. 3, the disk data PVD includes identification information relating to the disk, and is the first set of data passed to the data processor whenever file data is retrieved from the disk. The directory data concerns the names, sizes, etc. of the files, having substructure. For example, the uppermost root directory Dr includes subdirectory data Dsa, Dsb, Dsc . . . since each has further substructure. The lowermost subdirectories include corresponding file data F1, F2, F3 . . ., etc. which are passed along with the corresponding subdirectory data. The root directory data Dr is treated along with the disk data PVD.

The general process of passing file data of a storage medium such as a disk to a data processor, includes first retrieving the disk data and passing it through the buffer to the data processor. Second, the directory data identifying the location of the file is retrieved and passed through the buffer to the data processor. Finally, the file data is retrieved and passed through the buffer to the data processor. Thus, the retrieval operation which causes the data pickup to retrieve data from the disk must be repeatedly performed in accordance with the number of data to be accessed.

For example, when a number of file data F1 to F6 are sequentially requested by the data processor, the retrieval data flow is ordered as follows: Dsa→F1→Dsa→F2→Dsa→F3→Dsb→Dsc→F4→Dsc→F5→Dsb→Dsd→F6 following a prior PVD→Dr. operation. Thus, the retrieval data flow includes a repetition of same data (e.g., Dsa, Dsb, Dsc, etc.) to be passed through the buffer during the processing sequence. This decreases the data processing speed.

SUMMARY OF THE INVENTION

It is an object of the present invention to provide a method for passing data of an external memory device through a buffer to a data processor so as to reduce the data access time.

According to the present invention, a method for passing data of an external memory device through a buffer to a data processor, comprises the steps of dividing the storage region of the buffer into at least two subregions; passing a first set of data read from the external memory device through one of the two variable subregions to the data processor in response to a first instruction of the data processor, and passing the first set of data stored in the one subregion directly to the data processor instead of retrieving it from the external memory device when second data required by the data processor is the same as the first data. When the second set of data is different from the first set of data, it is read from the external memory device and passed through the other subregion to the data processor.

It is preferable that the division of the storage region of the buffer is carried out according to data size. For example, an optical disk device generally has a buffer size of about 128 to 256K bytes. Meanwhile, the size of a subdirectory is a few kilobytes. When the data flow alternates subdirectory data with file data, one of the subregions of the buffer usually passes the subdirectory data with the other passing the file data. Thus, a few kilobytes of the buffer is firstly allocated for the subdirectory data so that the remaining portion of the buffer may be used for the file data.

It is also preferable that the storage region of the buffer is selectively divided based on a prescribed reference value. For example, if the address of the previously required data is compared to the address of the presently required data and a difference greater than the prescribed reference value exists, it is not likely that there would be a request for the same data as the previous one remaining in one of the subregions. In this case, the storage region of the buffer does not need such division.

If the external memory device has an optical disk with the disk data for identification, the disk data is first passed to the data processor whenever file data is retrieved. Hence, it is preferable that a part of the buffer is fixedly allocated for the identification data of the optical disk, and the remaining portion is divided into at least two subregions. Thus, whenever file data is retrieved, the identification data may be supplied by the buffer without accessing the disk, thereby decreasing the number of the times required to seek data on the disk.

The present invention will now be described more specifically with reference to the drawings attached only by way of example.

BRIEF DESCRIPTION OF THE DRAWINGS

FIG. 2 is a table for illustrating the steps of passing data through a buffer to a data processor according to the method of the present invention.

DETAILED DESCRIPTION OF PREFERRED EMBODIMENTS

Figure 1:
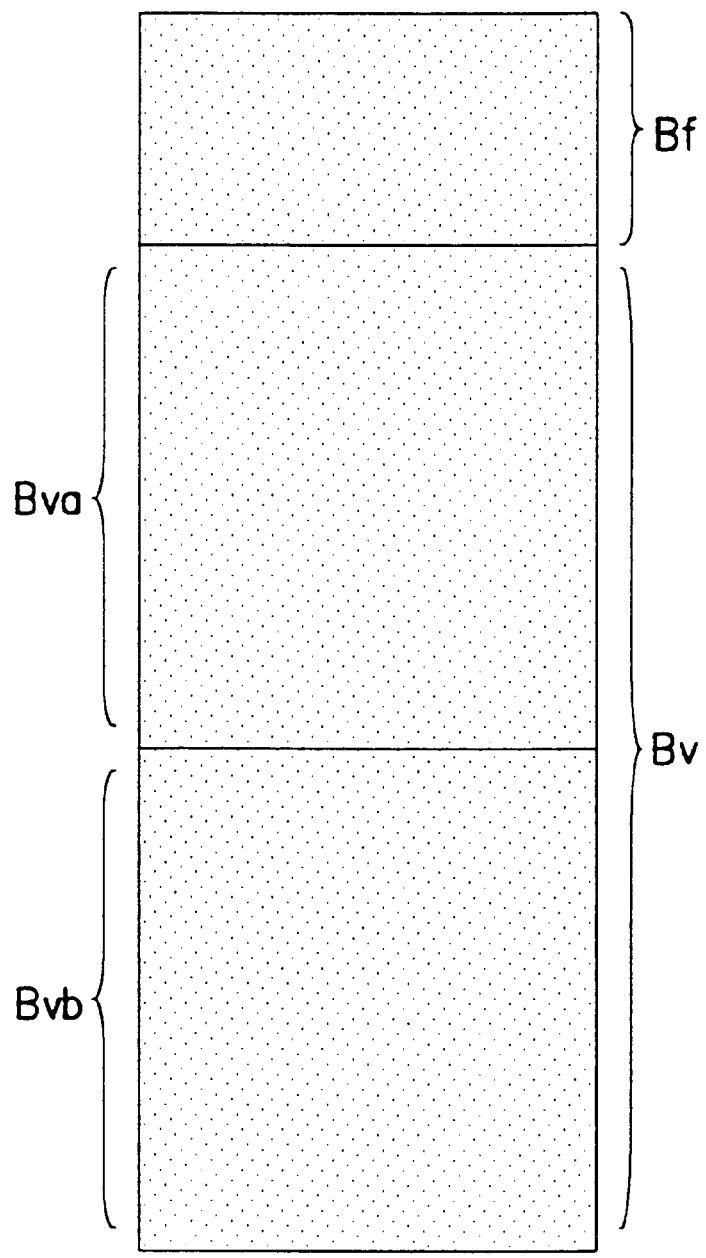
FIG. 1 is a diagram for illustrating the logical division of the storage region of a buffer according to the present invention.

Referring to FIG. 1, the storage region of the buffer is firstly divided into a fixed subregion Bf and a variable subregion Bv, which is again divided into two subregions Bva and Bvb.

The fixed subregion Bf is allocated to fixedly buffer the disk data and root directory data. Namely, if the disk data and root directory data of an optical disk are once buffered in the fixed subregion Bf, the fixed subregion Bf is not updated until a new optical disk is mounted. The fixed subregion Bf is set to have a capacity of a few kilobytes.

Meanwhile, the two subregions Bva and Bvb of the variable subregion Bv are allocated to buffer subdirectory and file data. They are divided or allocated based on the amount of subdirectory data. Thus, one block (subregion Bva or Bvb), is allocated according to the amount of the determined subdirectory data, and then the other is allocated.

Figure 3:
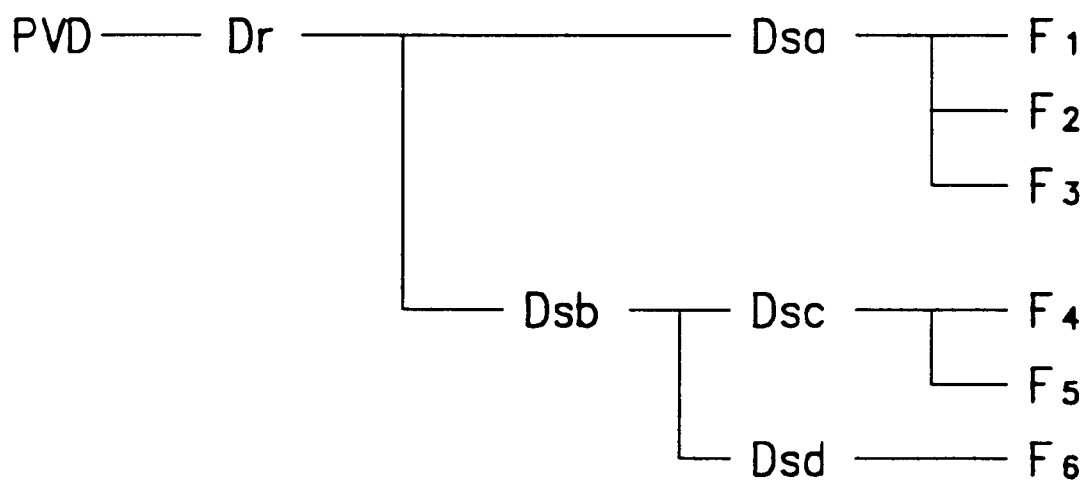
FIG. 3 is a schematic representation of a directory tree for illustrating the data structure of a generic optical disk.

Table 2 shown in FIG. 2 represents an exemplary case requiring a sequential flow of the file data F1 to F6 from the data structure as shown in FIG. 3. As previously described, the data flow of the subdirectory data and file data is Dsa→F1-Dsa→F2→Dsa→F3→Dsb→Dsc→F4→Dsc→F5→Dsb→Dsd→F6.

In data flow step 1, when the subdirectory data Dsa is requested, the subdirectory region of the disk is sought to read the subdirectory data Dsa, which is buffered in the subregion Bva and supplied to the data processor. In this case, the size of the subregion Bva is determined by the amount of the subdirectory data Dsa. The subdirectory data Dsa is not erased from the subregion Bva until new data is delivered to it.

In data flow step 2, when the file data F1 is requested, the file region of the disk is sought to read the file data F1, which is buffered in the subregion Bvb and supplied to the data processor. The file data F1 is also not erased from the subregion Bvb until new data is delivered to it.

In data flow step 3, when the file data F2 is requested, the subdirectory data Dsa is retrieved directly from the subregion Bva, and the file region of the disk is sought to read the file data F2, which is buffered in the subregion Bvb and supplied to the data processor. Likewise, the file data F2 also is not erased from the subregion Bvb until new data is delivered to it. The similar process is applied to all the following data flow steps.

In data flow step 4, when the file data F3 is requested, the subdirectory data Dsa is retrieved directly from the subregion Bva, and the file region of the disk is sought to read the file data F3, which is buffered in the subregion Bvb and supplied to the data processor.

In data flow step 5, when subdirectory data Dsb is requested, the subdirectory region of the disk is sought to read the subdirectory data Dsb, which is buffered in the subregion Bva and supplied to the data processor.

In data flow step 6, when subdirectory data Dsc is requested, the subdirectory region of the disk is sought to read the subdirectory data Dsc, which is buffered in the subregion Bvb and supplied to the data processor.

In data flow step 7, when file data F4 is requested, the file region of the disk is sought to read the file data F4, which is buffered in the subregion Bva and supplied to the data processor.

In data flow step 8, when the subdirectory data Dsc and the file data F5 are requested, the subdirectory data Dsc is retrieved directly from the subregion Bvb, and the file region of the disk is sought to read the file data F5, which is buffered in the subregion Bva and supplied to the data processor.

In data flow step 9, when subdirectory data Dsd is requested, the subdirectory region of the disk is sought to read the subdirectory data Dsd, which is buffered in the subregion Bvb and supplied to the data processor.

In data flow step 10, when file data F6 is requested, the file region of the disk is sought to read the file data F6, which is buffered in the subregion Bva and supplied to the data processor.

Thus, the inventive method needs ten times of data seeking in order to retrieve the sequence of the file data F1 to F6 while the conventional method needs fourteen times of data seeking to achieve the same result. In addition, the number of data seeking times may be further reduced by fixedly allocating a part of the storage region of the buffer for the disk data and root directory data. This results in a further reduction of the data retrieval or access time.

What is claimed is:

1. A method for passing data of an external memory device through a buffer to a data processor comprising the steps of:

dividing a storage region of the buffer into at least two variable subregions;

passing first data read from the external memory device through one of said subregions to the data processor in response to a first data request from the data processor;

passing the first data stored in one of said subregions directly to the data processor in response to a second data request when second data corresponding to the second data request is the same as said first data;

passing second data read from the external memory device through another of said subregions to the data processor when said second data is different from said first data; and allocating a portion of the buffer for receiving identification data of the external memory device.

2. The method according to claim 1, further comprising the step of allocating a portion of the buffer for receiving identification data of the external memory device.

3. The method according to claim 2, wherein the allocated portion of the buffer is not included in said at least two subregions.

4. A method for transmitting data contained on an external memory device to a data processor via a buffer, comprising the steps of:

dividing a storage region of the buffer into two variable subregions;

storing first data read from the external memory device and corresponding to a first data request in one of said variable subregions;

transmitting the stored first data to the data processor in response to the first data request;

transmitting the stored first data directly to the data processor in response to a second data request when the second data corresponding to said second data request is the same as said first data; and allocating a portion of the buffer for receiving identification data of the external memory device.

5. The method according to claim 4 further comprising the steps of:

storing the second data in the other of said variable subregions when said second data is different from said first data; and transmitting the stored second data to the data processor in response to said second data request.

6. The method according to claim 4, further comprising the step of allocating a portion of the buffer for receiving identification data of the external memory device.

7. The method according to claim 6, wherein said step of allocating is performed prior to said step of dividing, and said step of dividing is performed on the remaining portion of the buffer.

8. A method for passing data of an external memory device through a buffer to a data processor comprising the steps of:

dividing a storage region of the buffer into at least two subregions;

passing first data read from the external memory device through one of said subregions to the data processor in response to a first data request from the data processor;

passing the first data stored in one of said subregions directly to the data processor in response to a second data request when second data corresponding to the second data request is the same as said first data;

passing second data from the external memory device through another of said subregions to the data processor when said second data is different from said first data; and allocating a portion of the buffer for receiving identification data of the external memory device.

9. A method for transmitting data contained on an external memory device to a data processor via a buffer, comprising the steps of:

dividing a storage region of the buffer into two subregions;

storing first data read from the external memory device and corresponding to a first data request in one of said subregions;

transmitting the stored first data to the data processor in response to the first data request;

transmitting the stored first data directly to the data processor in response to a second data request when the second data corresponding to said second data request is the same as said first data; and allocating a portion of the buffer for receiving identification data of the external memory device.

* * * * *

UNITED STATES PATENT AND TRADEMARK OFFICE
CERTIFICATE OF CORRECTION

PATENT NO. : 6,032,206
DATED : February 29, 2000
INVENTOR(S) : Toshiyuki Ohtaki

It is certified that error appears in the above-indentified patent and that said Letters Patent is hereby corrected as shown below:

Title page, item [54] and col. 1, should read

--METHOD OF REDUCING ACCESS TIME WHEN PASSING DATA FROM EXTERNAL MEMORY THROUGH BUFFER TO DATA PROCESSOR BY ALLOCATING BUFFER PORTION FOR RECEIVING EXTERNAL MEMORY'S IDENTIFICATION DATA--.

Signed and Sealed this

Twentieth Day of March, 2001

*Attest:*

NICHOLAS P. GODICI

*Attesting Officer*     *Acting Director of the United States Patent and Trademark Office*